(12) United States Patent
Jia et al.

(10) Patent No.: US 10,401,669 B2
(45) Date of Patent: Sep. 3, 2019

(54) TOUCH DISPLAY PANEL HAVING CONDUCTIVE STRUCTURE AND TOUCH DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Peng Jia, Beijing (CN); Baoqiang Wang, Beijing (CN); Ning Li, Beijing (CN); Sang Jin Park, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/308,772

(22) PCT Filed: Mar. 4, 2016

(86) PCT No.: PCT/CN2016/075649
§ 371 (c)(1),
(2) Date: Nov. 3, 2016

(87) PCT Pub. No.: WO2017/054414
PCT Pub. Date: Apr. 6, 2017

(65) Prior Publication Data
US 2017/0276985 A1    Sep. 28, 2017

(30) Foreign Application Priority Data
Sep. 29, 2015 (CN) .......................... 2015 1 0634755

(51) Int. Cl.
*G06F 3/044* (2006.01)
*G02F 1/1333* (2006.01)
*G06F 3/041* (2006.01)

(52) U.S. Cl.
CPC .... *G02F 1/13338* (2013.01); *G02F 1/133345* (2013.01); *G06F 3/044* (2013.01);
(Continued)

(58) Field of Classification Search
CPC ........... G06F 3/041–044; G06F 3/0488; G06F 2200/1634; G06F 2200/04103–04112
See application file for complete search history.

(56) References Cited

U.S. PATENT DOCUMENTS

| 2008/0180400 A1* | 7/2008 | Kim ...................... G06F 3/0412 345/173 |
| 2008/0186288 A1* | 8/2008 | Chang .................. G06F 3/0412 345/174 |

(Continued)

FOREIGN PATENT DOCUMENTS

| CN | 103472613 A | 12/2013 |
| CN | 103870050 A | 6/2014 |

(Continued)

OTHER PUBLICATIONS

International Search Report and Written Opinion dated Apr. 29, 2016; PCT/CN2016/075649.

(Continued)

*Primary Examiner* — Sanghyuk Park
(74) *Attorney, Agent, or Firm* — Ladas & Parry LLP

(57) ABSTRACT

A touch display panel and a touch display device are disclosed to solve the problems that twisted nematic (TN) mode LCD panel in the known technology usually has complex structure, larger thickness and higher manufacturing costs. The touch display panel includes a first substrate (1) and a second substrate (2) disposed in opposite to each other, wherein a surface of the first substrate (1) facing the second substrate (2) is provided with a touch electrode (3), a surface of the second substrate (2) facing the first substrate (Continued)

(1) is provided with a touch line (4), and a conductive structure (5) is disposed between the first substrate (1) and the second substrate (2); wherein the touch electrode (3) is electrically connected with the touch line (4) through the conductive structure (5).

11 Claims, 2 Drawing Sheets

(52) U.S. Cl.
CPC ...... *G06F 3/0412* (2013.01); *G02F 2201/121* (2013.01); *G06F 2203/04111* (2013.01)

(56) References Cited

U.S. PATENT DOCUMENTS

| | | | | |
|---|---|---|---|---|
| 2010/0225608 | A1* | 9/2010 | Zhou | G02F 1/13338 345/173 |
| 2012/0050145 | A1* | 3/2012 | Yasumatsu | H01L 27/1214 345/80 |
| 2013/0229364 | A1 | 9/2013 | Yu et al. | |
| 2013/0257794 | A1* | 10/2013 | Lee | G06F 3/041 345/174 |
| 2014/0346493 | A1 | 11/2014 | Lee | |

FOREIGN PATENT DOCUMENTS

| | | |
|---|---|---|
| CN | 104238806 A | 12/2014 |
| CN | 104238823 A | 12/2014 |
| CN | 104407726 A | 3/2015 |
| CN | 104698700 A | 6/2015 |
| CN | 104793387 A | 7/2015 |
| CN | 105117073 A | 12/2015 |
| JP | 2009-087118 A | 4/2009 |

OTHER PUBLICATIONS

The First Chinese Office Action dated Jul. 11, 2017; Appln. No. 201510634755.1.
The Second Chinese Office Action dated Jan. 25, 2018; Appln. No. 201510634755.1.

* cited by examiner

TOUCH DISPLAY PANEL HAVING CONDUCTIVE STRUCTURE AND TOUCH DISPLAY DEVICE

Embodiments of the present invention relate to a touch display panel and a touch display device.

BACKGROUND

With the development of liquid crystal display (LCD) technology, as the simplest and most convenient and natural human-computer interaction mode, touch panel has been increasingly applied to the LCD field. According to a difference in working principle and in information media for detecting a touch operation, the touch panel can be classified into four types which are resistance touch panel, capacitive touch panel, infrared touch panel and surface acoustic wave touch panel. The capacitive touch panel has become the mainstream of the touch panel technology because of its characteristics such as simple technology, long product life and high light transmittance.

Generally, for a structure of a twisted nematic (TN) mode LCD panel integrated with a touch-control function in the known technology, the touch panel is directly disposed on a TN mode LCD panel, wherein each of the LCD panel and the touch panel comprises two layers of base substrates. It means that at least four layers of base substrates need to be attached together in the twisted nematic (TN) mode LCD panel integrated with a touch-control function in the known technology, which results in complex structure, larger product thickness and higher manufacturing cost.

SUMMARY

At least one embodiment of the present invention provides a touch display panel and a touch display device to solve the problems that the twisted nematic (TN) mode LCD panel integrated with a touch-control function in the known technology usually has complex structure, larger product thickness and high manufacturing costs.

On one aspect, an embodiment of the present invention provides a touch display panel, comprising a first substrate and a second substrate which are disposed opposite to each other, wherein a surface of the first substrate facing the second substrate is provided with a touch electrode, a surface of the second substrate facing the first substrate is provided with a touch line, and a conductive structure is disposed between the first substrate and the second substrate; wherein, the touch electrode is electrically connected with the touch line through the conductive structure.

In an example, the surface of the first substrate facing the second substrate is provided with a common electrode, and the touch electrode is formed as at least a part of the common electrode disposed on the surface of the first substrate facing the second substrate.

In an example, the first substrate is provided with a plurality of touch electrodes, the second substrate is provided with a plurality of touch lines, each of the touch electrodes is electrically connected with at least one of the touch lines, and each of the touch lines is electrically connected with only one of the touch electrodes.

In an example, the conductive structure is formed as a conductive pillar comprising an anisotropy conductive material.

In an example, the first substrate comprises a non-transparent region, and an orthographic projection of the conductive structure on the first substrate is located in the non-transparent region.

In an example, the second substrate comprises a non-display region, and an orthographic projection of the conductive structure on the second substrate is located in the non-display region.

In an example, a side of the conductive structure facing the corresponding touch line is provided with a first conductive layer, and the conductive structure is electrically connected with the touch line through the first conductive layer.

In an example, the conductive structure is directly contacted and electrically connected with the touch line.

In an example, the first conductive layer is electrically connected with the touch line through a via hole.

In an example, an insulating layer is disposed between a layer where the first conductive layer is located and a layer where the touch line is located, and a position in the insulating layer corresponding to the conductive structure is provided with a via hole.

In an example, the first conductive layer is a metal pad.

In an example, the touch line and a data line or a gate line on the second substrate are disposed in a same layer.

In an example, the touch line and the data line or gate line on the second substrate are made of a same material.

On another aspect, an embodiment of the present invention provides a touch display device comprising any one of the above touch display panels.

BRIEF DESCRIPTION OF THE DRAWINGS

Hereafter, the embodiments of the present invention will be descried in detail with reference to the accompanying drawings, so as to make those skilled in the art understand the present invention more clearly, wherein.

DETAILED DESCRIPTION

Hereafter, the technical solutions of the embodiments of the present disclosure will be described in a clear and complete way in connection with the drawings related to the embodiments of the present disclosure. It is obvious that the described embodiments are just a part but not all of the present disclosure. Based on the described embodiments of the present disclosure, those ordinarily skilled in the art can obtain other embodiment(s), without any inventive work, which come(s) within the scope sought for protection by the present disclosure.

Unless otherwise defined, the technical terminology or scientific terminology used herein should have the same meaning as commonly understood by one of ordinary skill in the art to which this invention belongs. Terms used in the present description and claims such as "first", "second" and so on are only used for distinguishing different components, and cannot be construed as indicating or implying sequence, amount and relative importance. Likewise, a term "a," "an," or "the" does not indicate limitation in number, but specifies the presence of at least one. The phrases "connect", "connected", etc., are not intended to define a physical connection or mechanical connection, but may include an electrical connection, directly or indirectly. "On," "under," "right,"

"left" and the like are only used to indicate relative position relationship, and when the position of the object which is described is changed, the relative position relationship may be changed accordingly.

Figure 1:
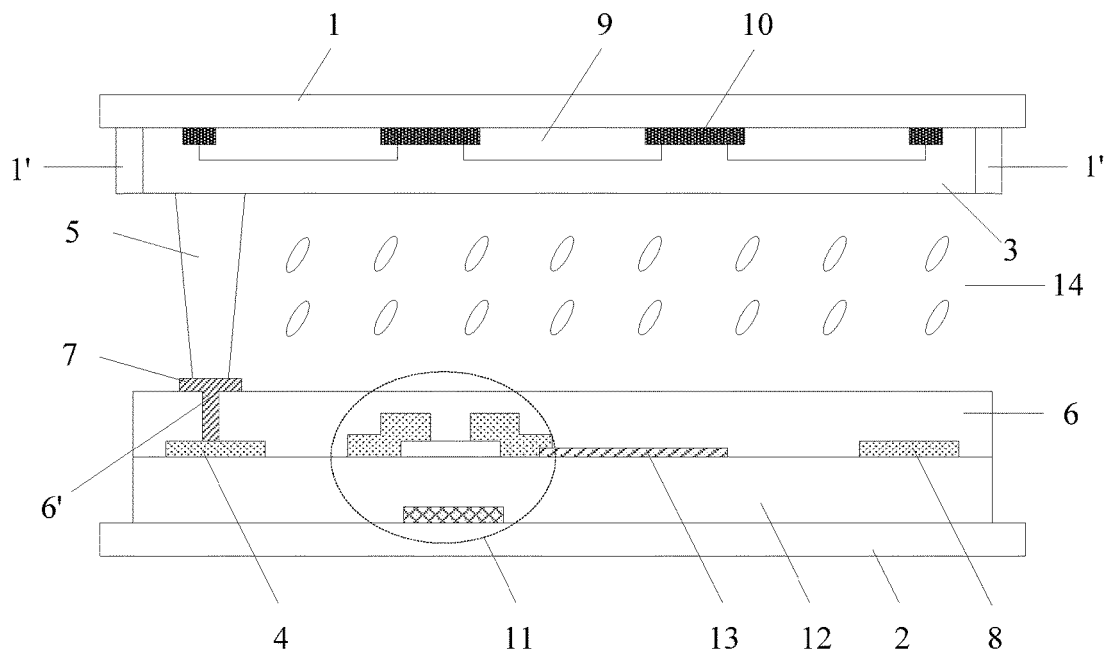
FIG. 1 is a structural schematic diagram of a touch display panel according to an embodiment of the present invention.
Figure 2:
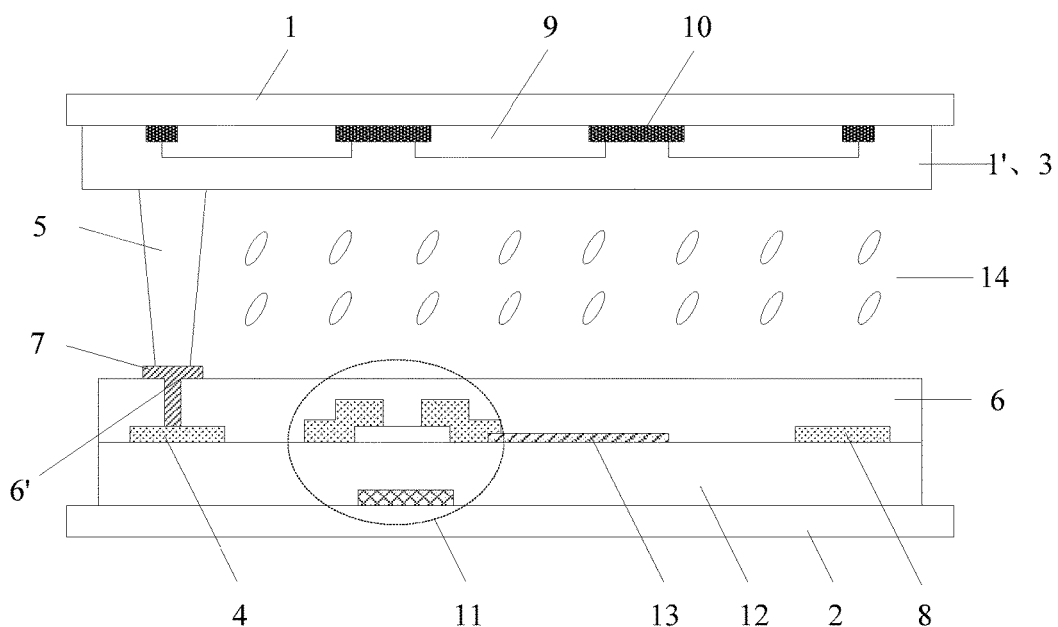
FIG. 2 is another structural schematic diagram of a touch display panel according to an embodiment of the present invention.

Referring to FIGS. 1-2, an embodiment of the present invention provides a touch display panel comprising a first substrate 1 and a second substrate 2 disposed in opposite to each other; wherein a surface of the first substrate 1 facing the second substrate 2 is provided with a touch electrode 3, a surface of the second substrate 2 facing the first substrate 1 is provided with a touch line 4, a conductive structure 5 is disposed between the first substrate 1 and the second substrate 2, and the touch electrode 3 is electrically connected with the touch line 4 through the conductive structure 5.

In the embodiment of the present invention, by disposing the conductive structure 5 between the first substrate 1 and the second substrate 2, the touch electrode 3 disposed on the first substrate 1 and the touch line 4 disposed on the second substrate 2 are electrically connected with each other to realize a touch-control function without additionally disposing a touch panel, which simplifies the structure of the touch display panel, reduces the product thickness and also the manufacturing cost; meanwhile, because the conductive structure 5 is disposed between the first substrate 1 and the second substrate 2, wirings disposed at two sides of the display panel can be reduced, which is convenient for narrow frame design; furthermore, because the touch electrode 3 and the touch line 4 are separately located at different substrates (for example, the touch electrode 3 is located on the first substrate 1, and the touch line 4 is located on the second substrate 2), a relatively large distance and a relatively small capacitance are provided between the touch electrode 3 and signal lines or other touch lines except the one connected therewith, which can improve the touch sensitivity.

In an embodiment according to the present invention, the touch electrode 3 can be an electrode layer which is independently formed to realize the touch-control function, or can be designed based on the existing common electrode of the TN mode display panel.

In an embodiment according to the present invention, the touch electrode 3 is at least a part of a common electrode 1' disposed on a surface of the first substrate 1 facing the second substrate 2; namely, the touch electrode 3 is a part of the common electrode 1' or the common electrode 1' completely serves as the touch electrode 3. For example, as illustrated in FIG. 1, the touch electrode 3 is defined by a part of the common electrode 1'; while as illustrated in FIG. 2, the touch electrode 3 serves as the common electrode 1' at the same time. Therefore, it is not necessary to additionally form an electrode layer to realize the touch-control function, which can reduce the thickness of the TN mode touch display panel.

In an example, in order to allow the touch electrode 3 to achieve relatively accurate detection of touch motion, the touch electrodes 3 can be designed such that their vertical projections on the first substrate 1 have a same shape and area, i.e., the shapes of the touch electrodes 3 are the same and the size of the touch electrodes 3 are equal with each other; meanwhile, all of the touch electrodes 3 are evenly distributed on the first substrate 1. It is to be noted that a vertical projection of the touch electrode 3 on the first substrate 1 can be any geometric figures, e.g., rectangle.

In an example, the touch electrode 3 can transmit a common electrode signal and a touch signal in a time division mode.

Figure 3:
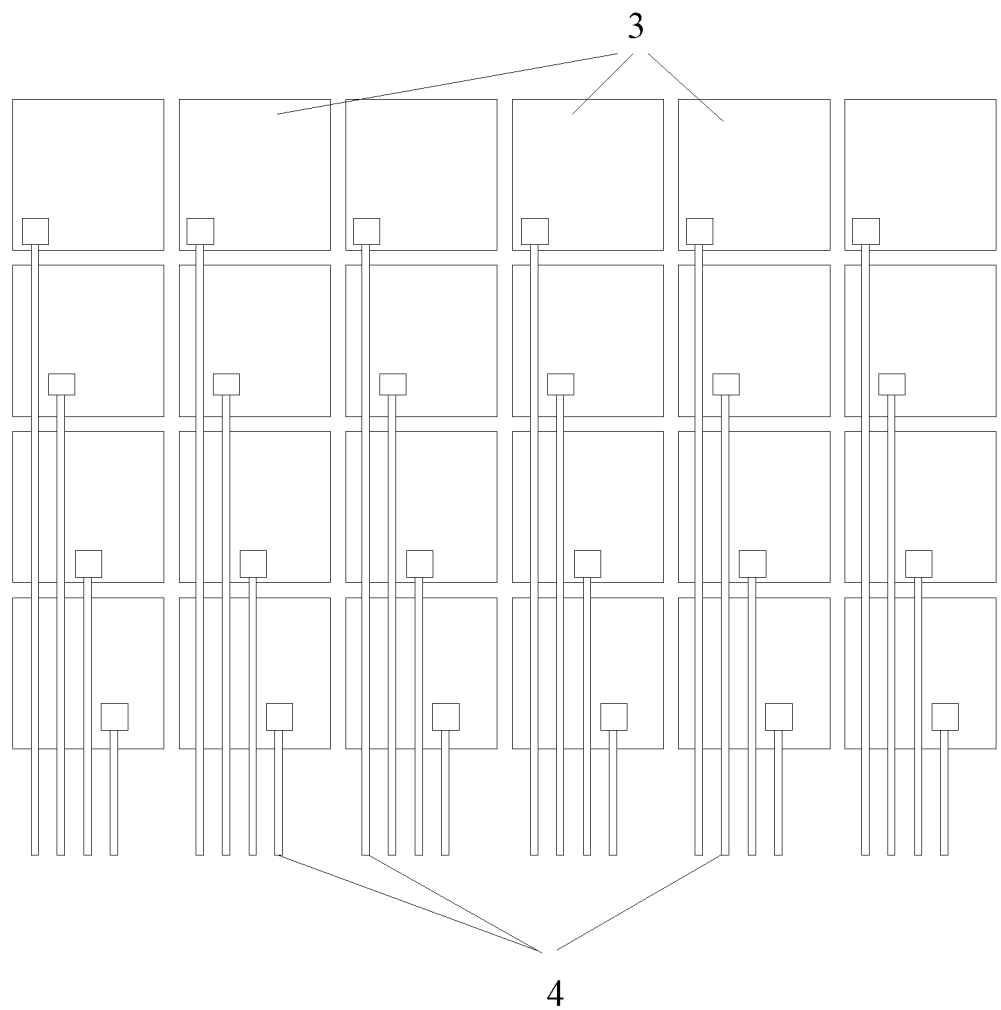
FIG. 3 is a plan view illustrating an electrical connection between a touch electrode and a touch line in a touch display panel provided by an embodiment of the present invention.

In an example, the first substrate 1 can be provided with a plurality of touch electrodes 3, the second substrate 2 can be provided with a plurality of touch lines 4, and each of the touch electrodes 3 is at least electrically connected with one of the touch lines 4. That is to say, each of the touch electrodes 3 can be electrically connected with one or more touch lines 4, so as to be flexibly disposed; upon each of the touch electrodes 3 is electrically connected with a plurality of touch lines 4, an electrical resistance can be reduced. For example, FIG. 3 illustrates a plan view of an electrical connection between the touch electrodes 3 and the touch lines 4, in which a plurality of touch electrodes 3 and a plurality of touch lines are electrically connected in a one-to-one corresponding mode.

In an example, in order to conveniently control and process the touch signal, each of the touch lines 4 is electrically connected with only one touch electrode 3, and each of the touch lines 3 only transmit a touch signal of one touch electrode 3.

It is to be noted that, during particular practice, the touch lines 4 electrically connected with the touch electrodes 3 can be respectively detected in a sequence along rows or along columns according to the arrangement of the touch electrodes 3, so as to realize the touch-control function of the touch display panel.

In an example, the conductive structure 5 can be formed as a conductive pillar. For example, the conductive structure 5 can be a conductive pillar added with an anisotropy conductive material, which allows a conductive direction more definite. For another example, in order to simplify the process and reduce the space as occupied, the conductive structure 5 in the form of conductive pillar can be disposed at a location where a supporting element is to be formed, i.e., the conductive structure 5 can simultaneously serve as a supporter.

In an example, in order to prevent the conductive structure 5 from affecting the light transmittance of the touch display panel, an orthographic projection of the conductive structure 5 on the first substrate 1 is located in a non-transparent region of the first substrate 1, or, an orthographic projection of the conductive structure 5 on the second substrate 2 is located in a non-display region between adjacent pixels.

It is to be noted that, the non-transparent region mentioned in the embodiments of the present invention refers to all non-transparent regions on the touch display panel, for example, a black matrix region, a region shielded by signal lines on the panel, or a region where a thin film transistor (TFT) is located. And the non-display region mentioned in the embodiments of the present invention refers to a region being not configured for display, for example, a black matrix region or a peripheral circuit region. For example, as illustrated in FIGS. 1-2, an orthographic projection of the conductive structure 5 on the first substrate 1 can be located in a region shielded by a black matrix 10, but those skilled in the art shall understand that the embodiments of the present invention are not intended to be limited thereto.

In the embodiment of the present invention, the electrical connection between the conductive structure 5 and the touch line 4 can be flexibly selected according to different design requirements. For example, the conductive structure 5 can be electrically connected with the touch line 4 though a first conductive layer 7; for another example, the conductive structure 5 can be directly contacted and electrically connected with the touch line 4.

In an example where the conductive structure 5 and the touch line 4 are electrically connected through a first conductive layer 7, the first conductive layer 7 can be electrically connected with the touch line 4 through a via hole. For example, as illustrated in FIGS. 1-2, the first conductive layer 7 can be disposed at an end of the conductive structure 5, an insulating layer 6 can be disposed between a layer where the first conductive layer 7 is located and a layer where the touch line 4 is located, and the insulating layer 6 is provided with plural via holes 6' (for simplicity, FIGS. 1-2 only illustrate one via hole) which are disposed in one-to-one correspondence with the conductive structures 5; the first conductive layer 7 is electrically connected with the touch lines 4 through these via holes 6'.

In the embodiment of the present invention, the first conductive layer 7 can be formed of any known materials with conductive performance such as a transparent conductive material or a metal material. For example, in order for a relatively small electrical resistance of the touch detection circuit, the first conductive layer 7 can be a metal pad.

In the embodiment of the present invention, in order for smaller thickness of the touch display panel or for consideration of simplifying the manufacturing processes, the touch line 4 can be disposed in a same layer with data lines 8 or gate lines and common electrode lines (not illustrated); in some embodiments, the touch line 4 can be formed of a same material with that of the data lines 8 or gate lines and common electrode lines (not illustrated); in this way, the touch line 4 can be formed along with the other signal lines, so as to further simplify the processes and reduce the manufacturing cost.

It is to be noted that, in some embodiments of the present invention, the touch display panel can further comprise other elements or layer structures, such as a color resist 9 disposed on the first substrate 1, a TFT 11 disposed on the second substrate 2, a gate insulating layer 12, a pixel electrode 13, and liquid crystals 14 disposed between the first substrate 1 and the second substrate 2. These components are all well-known in the present field without repeating details thereof herein.

It is to be noted that, in some embodiments of the present invention, the touch display panel is a self-capacitive touch display panel, which can serve as a self-capacitive TN mode touch display panel; of course, several variations and modifications of the touch display panel provided by the present embodiment are available to serve as other types of self-capacitive touch display panels.

As stated above, in the touch display panel according to the embodiments of the present invention, a conductive structure is disposed between the first substrate and the second substrate to electrically connect the touch electrode on the first substrate with the touch line on the second substrate, so as to realize the touch-control function without additionally disposing a touch panel, which can simplify the structure of TN mode touch display panel, reduce the product thickness and reduce the cost; meanwhile, by utilizing the conductive structure disposed between the first substrate and the second substrate as a conductor, it can reduce the wirings at two sides of the display panel, which is convenient for narrow frame design; furthermore, because the touch electrode and the touch line are separately located at different substrates (for example, the touch electrode is located on the first substrate, while the touch line is located on the second substrate), a relatively large distance is provided between the touch electrode and the touch line to decrease a capacitance there-between, which can improve the touch sensitivity.

The embodiments of the present invention further provide a touch display device comprising the touch display panel provided by any one of the abovementioned embodiments.

Of course, the touch display device can further comprise a backlight module, a casing, a peripheral circuit board or other necessary components which are all well-known in the present field without repeating details thereof herein.

As stated above, in the touch display device according to the embodiments of the present invention, a conductive structure is disposed between the first substrate and the second substrate to electrically connect the touch electrode on the first substrate with the touch line on the second substrate, so as to realize the touch-control function without additionally disposing a touch panel, which can simplify the structure of TN mode touch display panel, reduce the product thickness and reduce the cost; meanwhile, by disposing the conductive structure between the first substrate and the second substrate, it can reduce the wirings at two sides of the display panel, which is convenient for narrow frame design; furthermore, because the touch electrode and the touch line are separately located at different substrates (for example, the touch electrode is located on the first substrate, while the touch line is located on the second substrate), a relatively large distance is provided between the touch electrode and the touch line to decrease a capacitance there-between, which can improve the touch sensitivity.

The foregoing are merely specific embodiments of the invention, but not limitative to the protection scope of the present disclosure. Therefore, the protection scope of the invention should be defined by the accompanying claims.

The present disclosure claims the benefits of Chinese patent application No. 201510634755.1, which was filed on Sep. 29, 2015 and is fully incorporated herein by reference as part of this application.

What is claimed is:

1. A touch display panel, comprising a first substrate and a second substrate disposed in opposite to each other, wherein a surface of the first substrate facing the second substrate is provided with a plurality of touch electrodes, a surface of the second substrate facing the first substrate is provided with a plurality of touch lines, and a conductive structure is disposed between the first substrate and the second substrate; wherein, the plurality of touch electrodes are arranged in parallel, and are electrically connected with the plurality of touch lines in one-to-one correspondence, through the conductive structure, wherein a side of the conductive structure facing a corresponding touch line is provided with a first conductive layer, and the conductive structure is electrically connected with the corresponding touch line through the first conductive layer, the first conductive layer is a T-shaped metal pad, including a horizontally arranged first portion and a vertically arranged second portion, the first portion is in direct contact with the conductive structure and the second portion is in direct contact with the touch line, and an orthographic projection of the second portion on the second substrate falls into an orthographic projection of the first portion on the second substrate.

2. The touch display panel according to claim 1, wherein the surface of the first substrate facing the second substrate is provided with a common electrode, and the touch electrode is formed as at least a part of the common electrode.

3. The touch display panel according to claim 2, wherein the first substrate comprises a non-transparent region, and an orthographic projection of the conductive structure on the first substrate is located in the non-transparent region.

4. The touch display panel according to claim 2, wherein the second substrate comprises a non-display region, and an orthographic projection of the conductive structure on the second substrate is located in the non-display region.

5. The touch display panel according to claim 1, wherein the first substrate comprises a non-transparent region, and an orthographic projection of the conductive structure on the first substrate is located in the non-transparent region.

6. The touch display panel according to claim 1, wherein the second substrate comprises a non-display region, and an orthographic projection of the conductive structure on the second substrate is located in the non-display region.

7. The touch display panel according to claim 1, wherein the first conductive layer is electrically connected with the touch line through a via hole.

8. The touch display panel according to claim 7, wherein an insulating layer is disposed between a layer where the first conductive layer is located and a layer where the touch line is located, and a position in the insulating layer corresponding to the conductive structure is provided with a via hole.

9. The touch display panel according to claim 1, wherein the touch line and a data line or a gate line on the second substrate are disposed in a same layer.

10. The touch display panel according to claim 1, wherein the touch line and a data line or a gate line on he second substrate are made of a same material.

11. A touch display device, comprising the touch display panel according to claim 1.

* * * * *